(12) United States Patent
Lim et al.

(10) Patent No.: US 9,363,533 B2
(45) Date of Patent: Jun. 7, 2016

(54) METHOD AND APPARATUS FOR VIDEO-ENCODING/DECODING USING FILTER INFORMATION PREDICTION

(75) Inventors: Sung Chang Lim, Daejeon (KR); Hui Yong Kim, Daejeon (KR); Se Yoon Jeong, Daejeon (KR); Suk Hee Cho, Daejeon (KR); Jong Ho Kim, Daejeon (KR); Ha Hyun Lee, Seoul (KR); Jin Ho Lee, Daejeon (KR); Jin Soo Choi, Daejeon (KR); Jin Woong Kim, Daejeon (KR); Chie Teuk Ahn, Daejeon (KR); Hae Chul Choi, Daejeon (KR)

(73) Assignees: Electronics and Telecommunications Research Institute, Daejeon (KR); Industry-Academic Cooperation Foundation Hanbat National Univ, Daejeon (KR)

( * ) Notice: Subject to any disclaimer, the term of this patent is extended or adjusted under 35 U.S.C. 154(b) by 644 days.

(21) Appl. No.: 13/876,938

(22) PCT Filed: Sep. 29, 2011

(86) PCT No.: PCT/KR2011/007200
§ 371 (c)(1),
(2), (4) Date: Mar. 29, 2013

(87) PCT Pub. No.: WO2012/044093
PCT Pub. Date: Apr. 5, 2012

(65) Prior Publication Data
US 2013/0182779 A1 Jul. 18, 2013

(30) Foreign Application Priority Data

Sep. 29, 2010 (KR) .......... 10-2010-0094543
Sep. 29, 2011 (KR) .......... 10-2011-0099197

(51) Int. Cl.
*H04N 19/597* (2014.01)
*H04N 19/117* (2014.01)
(Continued)

(52) U.S. Cl.
CPC .......... *H04N 19/597* (2014.11); *H04N 19/117* (2014.11); *H04N 19/30* (2014.11); *H04N 19/34* (2014.11); *H04N 19/36* (2014.11); CPC .......... *H04N 19/463* (2014.11); *H04N 19/635* (2014.11); *H04N 19/80* (2014.11); *H04N 19/82* (2014.11)

(58) Field of Classification Search
None
See application file for complete search history.

(56) References Cited

U.S. PATENT DOCUMENTS

| 5,619,256 A * | 4/1997 | Haskell et al. ......... H04N 13/00 348/43 |
| 2008/0089417 A1* | 4/2008 | Bao et al. ................. H04N 7/12 375/240.16 |

(Continued)

FOREIGN PATENT DOCUMENTS

| KR | 1020060080107 A | 7/2006 |
| KR | 100759870 B1 | 9/2007 |
| KR | 1020090079939 A | 7/2009 |

*Primary Examiner* — David N Werner
(74) *Attorney, Agent, or Firm* — William Park & Associates Ltd.

(57) ABSTRACT

Provided is a scalable video-decoding method based on multiple layers. The scalable video-decoding method according to the present invention comprises: a step of predicting first filter information of a video to be filtered using the information contained in an object layer and/or information contained in another layer, and generating second filter information in accordance with the prediction; and a step of filtering the video to be filtered using the second filter information. According to the present invention, the amount of information being transmitted is reduced, and video compression performance is improved.

16 Claims, 12 Drawing Sheets

(51) Int. Cl.
*H04N 19/36* (2014.01)
*H04N 19/34* (2014.01)
*H04N 19/463* (2014.01)
*H04N 19/30* (2014.01)
*H04N 19/82* (2014.01)
*H04N 19/635* (2014.01)
*H04N 19/80* (2014.01)

(56) References Cited

U.S. PATENT DOCUMENTS

2012/0033040 A1\* 2/2012 Pahalawatta ......... H04N 19/597
  348/43
2012/0236115 A1\* 9/2012 Zhang ................. H04N 19/597
  348/43

\* cited by examiner

METHOD AND APPARATUS FOR VIDEO-ENCODING/DECODING USING FILTER INFORMATION PREDICTION

TECHNICAL FIELD

The present invention relates to video processing, and more particularly, to video coding/decoding method and apparatus.

BACKGROUND ART

Recently, with the expansion of broadcasting services having high definition (HD) resolution in the country and around the world, many users have been accustomed to a high resolution and definition video, such that many organizations have conducted many attempts to develop next-generation video devices. In addition, the interest in HDTV and ultra high definition (UHD) having a resolution four times higher than that of HDTV have increased and thus, a compression technology for higher-resolution and higher-definition video have been required.

For the video compression, an inter prediction technology of predicting pixel values included in a current picture from a picture before and/or after the current picture, an intra prediction technology of predicting pixel values included in a current picture using pixel information in the current picture, an entropy coding technology of allocating a short code to symbols having a high appearance frequency and a long code to symbols having a low appearance frequency, a filtering technology of reducing distortion, error, blocking artifact occurring in the reconstructed picture, or the like, may be used.

An example of the video compression technology may include a technology providing a predetermined network bandwidth under a limited operation environment of hardware, without considering a flexible network environment. However, in order to compress video data applied to the network environment in which the bandwidth is frequently changed, a new compression technology is required. To this end, a scalable video coding/decoding method may be used.

In addition, in order to provide the three-dimensional videos, a multi-view video coding/decoding method may also be used. In the currently released three-dimensional video coding/decoding method, more than two-view videos are displayed on a spatially split display panel while simultaneously reproducing each video of an individual view. The views of videos simultaneously reproduced are separated by driving schemes such as a polarizing film, a lenticular sheet, a parallax barrier, or the like. Therefore, videos of different views are provided to two eyes of a person and the reproduced videos are recognized as three-dimensional videos.

DISCLOSURE

Technical Problem

The present invention provides scalable video coding method and apparatus capable of improving video compression performance while reducing transmitted information amount.

The present invention also provides scalable video decoding method and apparatus capable of improving video compression performance while reducing transmitted information amount.

The present invention also provides multi-view video coding method and apparatus capable of improving video compression performance while reducing transmitted information amount.

The present invention also provides multi-view video decoding method and apparatus capable of improving video compression performance while reducing transmitted information amount.

The present invention also provides filtering method and apparatus capable of improving video compression performance while reducing transmitted information amount.

The present invention also provides filter information prediction method and apparatus capable of improving video compression performance while reducing transmitted information amount.

Technical Solution

In an aspect, there is provided a scalable video decoding method based on multi layers, including: generating second filter information including prediction values for first filter information by using at least one of information included in an object layer and information included in the other layer; and performing filtering on a video to be filtered by using the first filter information based on the second filter information, wherein the object layer is a layer including the video to be filtered, the other layer that is a layer other than the object layer is used to perform decoding at the object layer, the first filter information is information for filtering of the video to be filtered, and the second filter information is prediction filter information generated for filtering the video to be filtered.

The first filter information may be at least one of adaptive loop filter information, interpolation filter information, and deblocking filter information.

The scalable video decoding method may further include receiving a filter information prediction indicator from a coder, wherein the filter information prediction indicator may indicate at least one of information on whether prediction for any of the first filter information is performed, information on whether the prediction for the first filter information is performed using information of any layer, information on whether the first filter information is predicted from any filter information, and information on a method using the second filter information.

At the generating of the second filter information including the prediction values for the first filter information, the prediction for the first filter information may be performed using information included in a layer indicated by the filter information prediction indicator among the object layer and the other layer.

The scalable video decoding method may further include receiving difference information of the first filter information and the second filter information from a coder, wherein the performing of the video to be filtered using the first filter information based on the second filter information may include: generating the first filter information by summing up the second filter information and the difference information; and performing the filtering on the video to be filtered using the first filter information.

In another aspect, there is provided a filtering method for decoding scalable videos based on multi layers, including: generating second filter information including prediction values for first filter information by using at least one of information included in an object layer and information included in the other layer; and performing filtering on a video to be filtered by using the first filter information based on the second filter information, wherein the object layer is a layer including the video to be filtered, the other layer that is a layer other than the object layer is used to perform decoding at the object layer, the first filter information is information for filtering of the video to be filtered, and the second filter information is prediction filter information generated for filtering the video to be filtered.

The first filter information may be at least one of adaptive loop filter information, interpolation filter information, and deblocking filter information.

The filtering method may further include receiving a filter information prediction indicator from a coder, wherein the filter information prediction indicator indicates at least one of information on whether prediction for any of the first filter information is performed, information on whether the prediction for the first filter information is performed using information of any layer, information on whether the first filter information is predicted from any filter information, and information on a method using the second filter information.

At the generating of the second filter information including the prediction values for the first filter information, the prediction for the first filter information may be performed using information included in a layer indicated by the filter information prediction indicator among the object layer and the other layer.

The filtering method may further include receiving difference information of the first filter information and the second filter information from a coder, wherein the performing of the video to be filtered using the first filter information based on the second filter information may include: generating the first filter information by summing up the second filter information and the difference information; and performing the filtering on the video to be filtered using the first filter information.

In another aspect, there is provided a multi-view video decoding method based on videos captured at multi views, including: generating second filter information including prediction values for first filter information by using at least one of information included in an object view and information included in the other view; and performing filtering on a video to be filtered by using the first filter information based on the second filter information, wherein the object view is a view including the video to be filtered, the other view that is a view other than the object view is used to perform decoding at the object view, the first filter information is information for filtering of the video to be filtered, and the second filter information is prediction filter information generated for filtering the video to be filtered.

The first filter information may be at least one of adaptive loop filter information, interpolation filter information, and deblocking filter information.

The multi-view video decoding method may further include receiving a filter information prediction indicator from a coder, wherein the filter information prediction indicator indicates at least one of information on whether prediction for any of the first filter information may be performed, information on whether the prediction for the first filter information is performed using information of any layer, information on whether the first filter information is predicted from any filter information, and information on a method using the second filter information.

At the generating of the second filter information including the prediction values for the first filter information, the prediction for the first filter information may be performed using information included in a view indicated by the filter information prediction indicator among the object view and the other view.

The multi-view video decoding method may further include receiving difference information of the first filter information and the second filter information from a coder, wherein the performing of the video to be filtered using the first filter information based on the second filter information includes: generating the first filter information by summing up the second filter information and the difference information; and performing the filtering on the video to be filtered using the first filter information.

In another aspect, there is provided a filtering method for decoding multi-view videos based on videos captured at multi views, including: generating second filter information including prediction values for first filter information by using at least one of information included in an object view and information included in the other view; and performing filtering on a video to be filtered by using the first filter information based on the second filter information, wherein the object view is a view including the video to be filtered, the other view that is a view other than the object view is used to perform decoding at the object view, the first filter information is information for filtering of the video to be filtered, and the second filter information is prediction filter information generated for filtering the video to be filtered.

The first filter information may be at least one of adaptive loop filter information, interpolation filter information, and deblocking filter information.

The filtering method may further include receiving a filter information prediction indicator from a coder, wherein the filter information prediction indicator indicates at least one of information on whether prediction for any of the first filter information is performed, information on whether the prediction for the first filter information is performed using information of any layer, information on whether the first filter information is predicted from any filter information, and information on a method using the second filter information.

At the generating of the second filter information including the prediction values for the first filter information, the prediction for the first filter information may be performed using information included in a view indicated by the filter information prediction indicator among the object view and the other view.

The filtering method may further include receiving difference information of the first filter information and the second filter information from a coder, wherein the performing of the video to be filtered using the first filter information based on the second filter information includes: generating the first filter information by summing up the second filter information and the difference information; and performing the filtering on the video to be filtered using the first filter information.

Advantageous Effects

As set forth above, the exemplary embodiments of the present invention can improve the video compression performance while reducing the transmitted information amount, by using the scalable video coding method.

In addition, the exemplary embodiments of the present invention can improve the video compression performance while reducing the transmitted information amount by using the scalable video decoding method.

Further, the exemplary embodiments of the present invention can improve the video compression performance while reducing the transmitted information amount by using the multi-view video coding method.

In addition, the exemplary embodiments of the present invention can improve the video compression performance while reducing the transmitted information amount by the multi-view video decoding method.

In addition, the exemplary embodiments of the present invention can improve the video compression performance while reducing the transmitted information amount by using the filtering method.

In addition, the exemplary embodiments of the present invention can improve the video compression performance while reducing the transmitted information amount by using the filtering prediction method.

MODE FOR INVENTION

Hereinafter, exemplary embodiments of the present invention will be described in detail with reference to the accompanying drawings. In describing exemplary embodiments of the present invention, well-known functions or constructions will not be described in detail since they may unnecessarily obscure the understanding of the present invention.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. Further, in the present invention, "comprising" a specific configuration will be understood that additional configuration may also be included in the embodiments or the scope of the technical idea of the present invention.

Terms used in the specification, 'first', 'second', etc. can be used to describe various components, but the components are not to be construed as being limited to the terms. The terms are only used to differentiate one component from other components. For example, the 'first' component may be named the 'second' component without being departed from the scope of the present invention and the 'second' component may also be similarly named the 'first' component.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Figure 1:
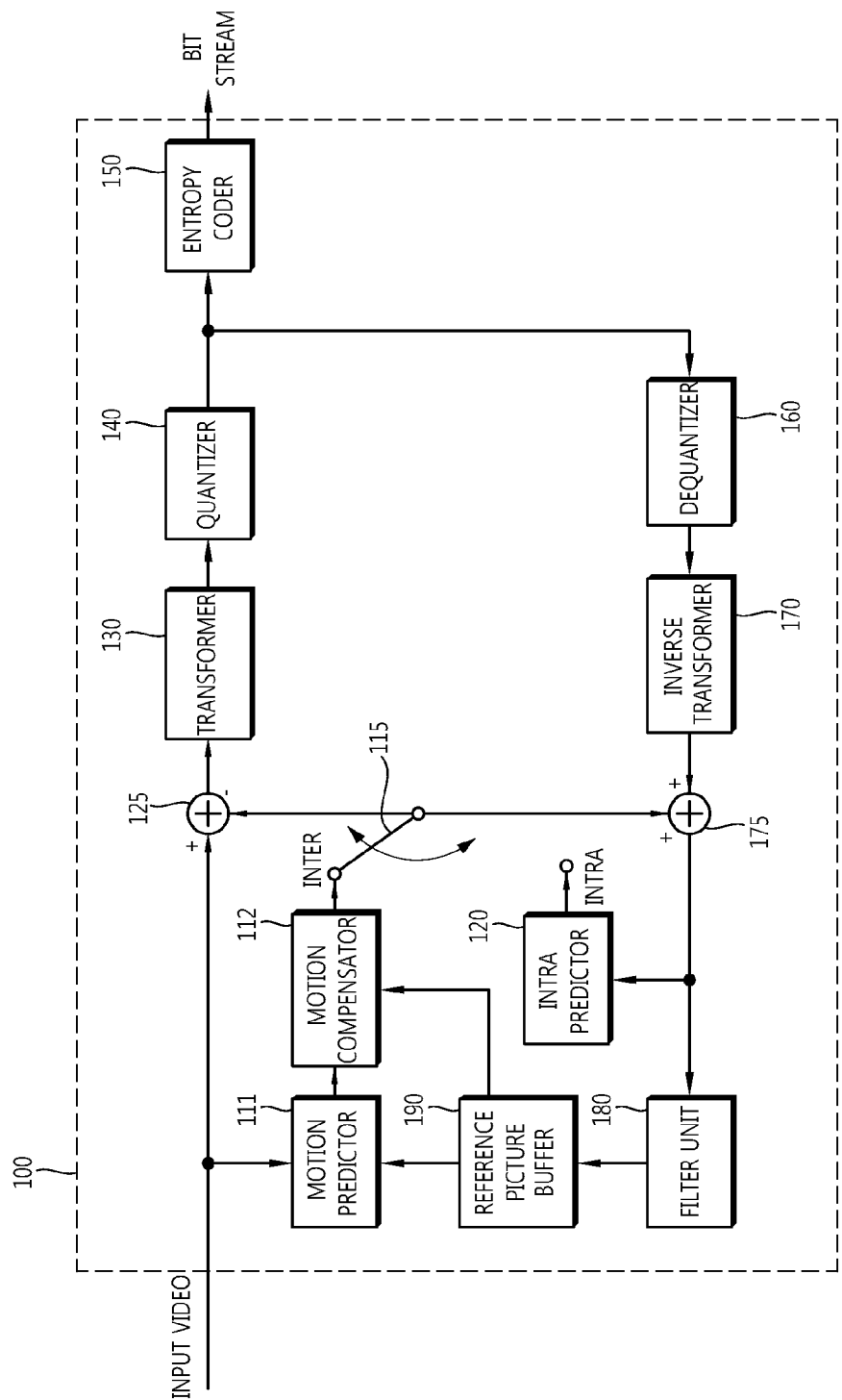
FIG. 1 is a block diagram showing a configuration of a video coding apparatus according to an exemplary embodiment of the present invention.

FIG. 1 is a block diagram showing a configuration of a video coding apparatus according to an exemplary embodiment of the present invention. Referring to FIG. 1, a video coding apparatus 100 includes a motion predictor 111, a motion compensator 112, an intra predictor 120, a switch 115, a subtractor 125, a transformer 130, a quantizer 140, an entropy coder 150, a dequantizer 160, an inverse transformer 170, an adder 175, a filter unit 180, and a reference picture buffer 190. The reference picture buffer 190 may be referred to as a decoded picture buffer. Hereinafter, the reference picture buffer 190 has the same meaning as a decoded picture buffer. In addition, the picture may have the same meaning as video according to a context or need.

The video coding apparatus 100 may perform coding on input videos to be coded with an intra mode or an inter mode and output bit streams. The intra prediction means intra-picture prediction and the inter prediction means inter-picture prediction. In the case of the intra mode, the switch 115 is switched to intra and in the case of the inter mode, the switch 115 is switched to inter mode. The video coding apparatus 100 may generate a prediction block for an input block of the input videos and then, code a difference between the input block and the prediction block.

In the case of the intra mode, the intra predictor 120 may perform the spatial prediction using the pixel values of the previously coded blocks around the current block to generate the prediction block.

In the inter mode, the motion predictor 111 may search a region optimally matched with the input block in the reference picture stored in the reference picture buffer 190 during the motion prediction process to obtain a motion vector. The motion compensator 112 may perform the motion compensation by using the motion vector and the reference picture stored in the reference picture buffer 190 to generate the prediction block.

When the motion predictor 111 and the motion compensator 112 in the inter mode perform the prediction to generate the prediction blocks, an interpolation filter may be used so as to predict pixel values in a sub-sample unit of a reconstructed video or a reconstructed block. The interpolation filter may be applied before or after the reconstructed picture or the reconstructed block is stored in the reference picture buffer 190. The interpolation filter may be based on a Wiener filter or a filter having a fixing filter coefficient.

When the interpolation filter is used, the pixel values in the block to be predicted may be predicted in a unit of an integer pixel or less to minimize distortion or difference between the video to be coded and the video to be previously reconstructed. Therefore, when the interpolation filter is used, video coding efficiency may be improved.

The subtractor 125 may generate a residual block by the difference between the input block and the generated prediction block. The transformer 130 may output transform coefficients by performing a transform on the residual block. Further, the quantizer 140 may quantize the input transform coefficient according to quantization parameters to output quantized coefficients.

The entropy coder 150 may perform entropy coding based on values calculated in the quantizer 140 or coding parameter values, or the like, calculated during the coding process to output bit streams.

When the entropy coding is applied, the entropy coding may represent symbols by allocating a small number of bits to the symbols having high occurrence probability and allocating a large number of bits to the symbols having low occurrence probability to reduce a size of the bit streams for the symbols to be coded. Therefore, the compression performance of the video coding may be increased through the entropy coding.

For the entropy coding, coding methods such as exponential golomb, context-adaptive variable length coding (CAVLC), context-adaptive binary arithmetic coding (CABAC), or the like, may be used. For example, the entropy coder 150 may be stored with a table for performing the entropy coding such as variable length coding/code (VLC) table and the entropy coder 150 may perform the entropy coding using the stored variable length coding/code (VLC) table. As another example, the entropy coder 150 may use a CABAC entropy coding method that generates bit streams by binarizing symbols and converts the binarized symbols into bins and predicting generation probability according to a context model to perform arithmetic encoding of the bins. In this case, the bin means each binary value (0 or 1) when the symbols are represented as the binary string through the binarization.

The quantized coefficient may be dequantized in the dequantizer 160 and inversely transformed in the inverse transformer 170. The dequantized, inversely transformed coefficients may be added to the prediction block through the adder 175 to generate a reconstructed block.

The reconstructed block passes through the filter unit 180 and the filter unit 180 may apply at least one of a deblocking filter, sample adaptive offset (SAO), and an adaptive loop filter to a reconstructed block or a reconstructed picture.

The deblocking filter may reduce quantization errors, such as ringing artifact generating edge echo around a strong edge, blocking artifact generating block distortion at an inter-block echo, or the like, based on the reconstructed picture or a signal of a reconstructed block. The deblocking filter may be applied followed by storing the reconstructed picture or the reconstructed block in the reference picture buffer 190. The video coding efficiency and the subjective quality of video may be improved through the deblocking filter.

The following processes may be performed in the deblocking filter according to the exemplary embodiment of the present invention.

1. Filtering edge decision process: the deblocking filter may differentiate the object edge subjected to the filtering. Basically, the coding and decoding unit in which the video used during the video coding and decoding process is separated may be determined as the object edge for performing the filtering. For example, any one of an edge of a coding unit, an edge of a prediction unit, and an edge of a transform unit may be an object edge that is subjected to the filtering.

2. Process of determining whether the filtering is performed: the deblocking filter uses at least one of result values of Equation using filter strength at the filtering object edge and an edge peripheral pixel values to determine whether the filtering is performed. For example, the filter strength may represent a tap size representing the number of input samples of a low pass filter, coefficients of a low pass filter, or the like, when the reconstructed samples present around the edge are subjected to the filtering. In this case, coding parameters may be used so as to determine the filter strength. For example, at least one of an intra-picture prediction mode, an inter-picture prediction mode, a motion vector, a reference picture index, coding block flags may be used as coding parameters. For example, the result values of Equation using the edge peripheral pixel values may be the result values of Equation that determines whether the filtering object edge is the blocking artifact or is the real edge present in the picture due to the transform and quantization. Therefore, the deblocking filter may determine whether the filter is applied to the filtering object edge and the filter type by using the result values of Equation using the filter strength and the edge peripheral pixel values at the filtering object edge.

3. Filtering performance process: the deblocking filter may perform the filtering on the filtering object edge by using the information on the determined edge and the performance or not. In this case, as a method for allowing the edge to be invisible to human sight, a low pass filter, a Wiener filter, or the like, may be used so as to minimize original picture and distortion according to variations, or the like, of the pixel values around the edge, so as to smooth the pixel values around the edge. In addition, one-dimensional filter or multi-dimensional filter of two-dimension or more may be used according to the filtering object edge. For example, the multi-dimensional filter of two-dimension or more may have a structure of filter coefficients, such as a filter shape such as a square, a circle, a rectangle, or the like, horizontal symmetry, vertical symmetry, diagonal symmetry, or the like. In addition, the listed various filters may be used during the filtering performance process according to the filter strength determined during the process of determining whether the filtering is performed, or the like.

The SAO may add a proper offset value to the pixel values so as to compensate a coding error.

The ALF may perform the filtering on the reconstructed picture based on the original picture. The ALF may be referred to an adaptive loop filter. Hereinafter, the adaptive loop filter and the ALF have the same meaning.

The adaptive loop filter may be applied followed by storing the reconstructed picture or the reconstructed block in the reference picture buffer 190. The adaptive loop filter obtains the adaptive loop filter coefficients reducing the distortion between the reconstructed picture and the original picture based on the Wiener filter to filter the reconstructed picture or the reconstructed block. The video coding efficiency and the subjective quality of video may be improved through the adaptive loop filter.

The following processes may be performed in the adaptive loop filter of the decoder according to the exemplary embodiment of the present invention.

1. Process of determining whether the adaptive loop filtering is performed: the adaptive loop filter signals whether the adaptive loop filtering is performed. For example, the information on whether the adaptive loop filtering is performed may be signaled to the decoder, with being included in the bit stream. The coder may signal whether or not to perform the filtering in a unit of a coding unit and signal whether or not to perform the filtering in a picture unit, including the information such as the flag determining whether or not to perform the filtering in the unit of the coding unit in the bit stream. In addition, the coder may perform the adaptive loop filtering only the coding unit having a specific depth in the coding unit by inserting the information on a maximum depth subjected to the filtering into the bit stream.

2. Process of determining adaptive loop filter parameter 2-1. Process of determining filter shape and process of determining filter coefficient:

when it is determined that the adaptive loop filtering is performed, the coder may determine and signal one of the filter shapes performing the adaptive loop filtering and determine and signal the filter coefficients used to perform the adaptive loop filtering. For example, the filter coefficient may be calculated in the coder. In this case, the number of filter coefficients may be at least one.

2-2. Process of classifying filter: when it is determined that the adaptive loop filtering is performed, as an example of the filter classification method, one of region-based adaptation (RA) and block-based adaption may be used. When the coder uses the filter classification method to perform the adaptive loop filtering, the filter may be selected differently. When the region based adaptation is used, any one of the plurality of filters per the split video region may be selected and when the block based adaptation is used, any one of the plurality of filters may be selected by considering the variations and directivity of the pixels.

3. Process of performing adaptive loop filtering: the coder may perform the adaptive loop filtering on the pixel of the reconstructed picture by using whether or not to perform the determined adaptive loop filtering and the determined filter parameters.

The reconstructed block passing through the filter unit 180 may be stored in the reference picture buffer 190.

Figure 2:
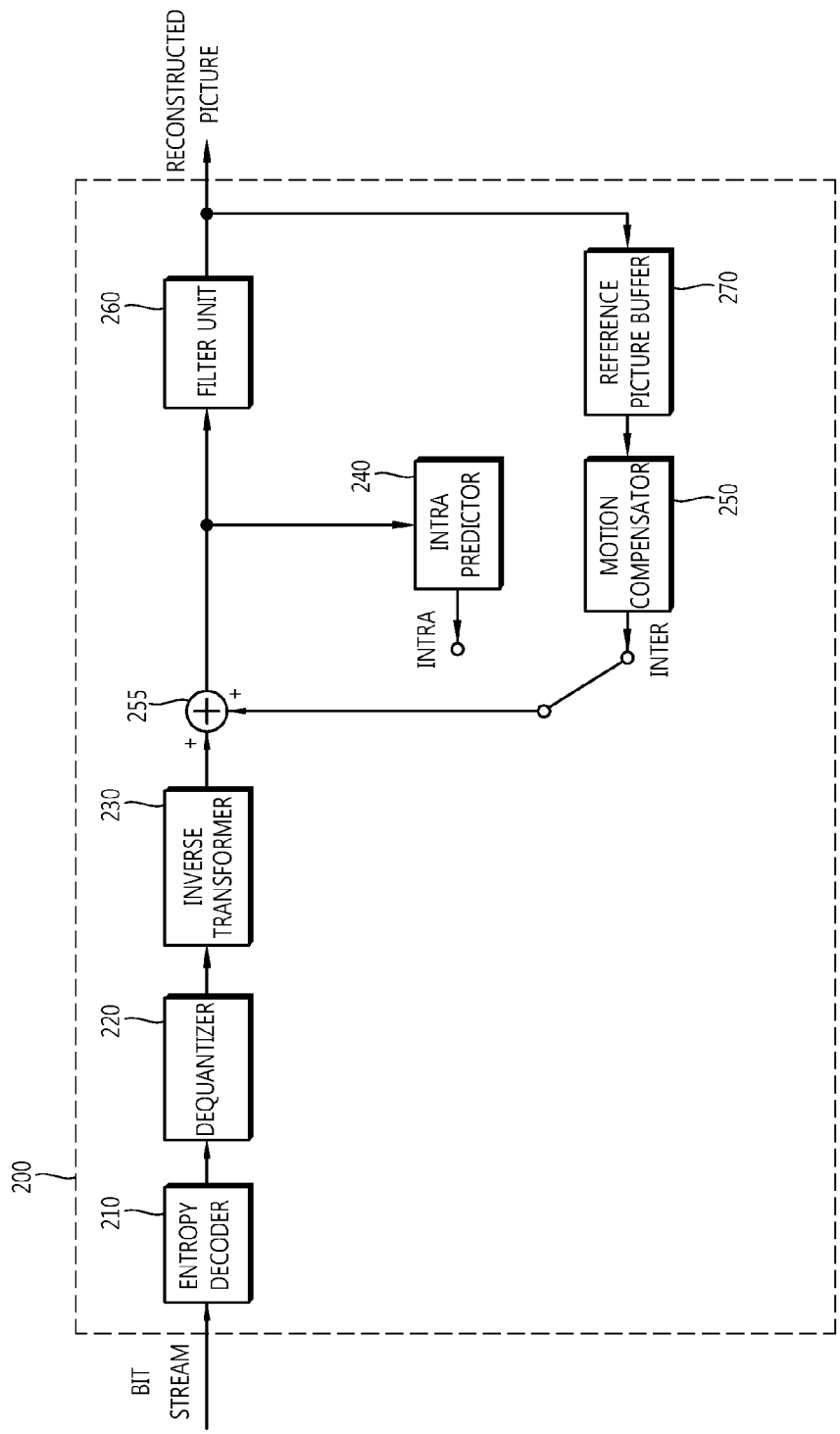
FIG. 2 is a block diagram showing a configuration of a video decoding apparatus according to an exemplary embodiment of the present invention.

FIG. 2 is a block diagram showing a configuration of a video decoding apparatus according to an exemplary embodiment of the present invention. Referring to FIG. 2, a video decoding apparatus 200 includes an entropy decoder 210, a dequantizer 220, a inverse transformer 230, an intra predictor 240, a motion compensator 250, a filter unit 260, and a reference picture buffer 270.

The video decoding apparatus 200 may receive the bit streams output from the coder to perform the decoding with the intra mode or the inter mode and output the reconstructed video, that is, the reconstructed picture. In the case of the intra mode, the switch may be switched to the intra and in the case of the inter mode, the switch may be switched to the inter mode. The video decoding apparatus 200 obtains a residual block reconstructed from the received bit streams and generates the prediction block and then, adds the residual block to the prediction block, thereby generating the reconstructed block, that is, the reconstructed block.

The entropy decoder 210 may perform the entropy coding on the input bit streams according to the probability distribution to generate the symbols having the quantized coefficient type of symbols. The entropy decoding method is similar to the above-mentioned entropy coding method.

When the entropy decoding method is applied, the entropy coding represents the symbols by allocating a small number of bits to the symbols having high generation probability and allocating a large number of bits to the symbols having low generation probability, thereby reducing a size of the bit streams for each symbol. Therefore, the compression performance of video decoding may be increased through the entropy decoding method.

The quantized coefficients are dequantized in the dequantizer 220 and are inversely transformed in the inverse transformer 230. The quantized coefficients may be dequantized/inversely transformed to generate the reconstructed residual block.

In the case of the intra mode, the intra predictor 240 may perform the spatial prediction using the pixel values of the previously coded blocks around the current block to generate the prediction block.

In the case of the inter mode, the motion compensator 250 may perform the motion compensation by using the motion vector and the reference picture stored in the reference picture buffer 270 to generate the prediction block. In this case, in order to predict the pixel values of the prediction block in a sub sample unit, an interpolation filter may be used and the details of the interpolation filter are described in advance in the exemplary embodiment of FIG. 1.

The reconstructed residual block and the prediction block are added through the adder 255 and the added block passes through the filter unit 260. The filter unit 260 may apply at least one of the deblocking filter, the SAO, and the ALF to the reconstructed block or the reconstructed picture. The filter unit 260 outputs the reconstructed videos, that is, the reconstructed picture. The details of the deblocking filter and the SAO may be described in advance in the exemplary embodiment of FIG. 1.

The adaptive loop filter of the decoder may perform the following process as the exemplary embodiment.

1.1. Process of determining whether the adaptive loop filtering is performed: when the decoder determines whether the adaptive loop filtering is performed, adaptive_loop_filter_ flag included in the bit streams is parsed to determine whether the adaptive loop filtering is performed. The decoder may determine whether or not to perform the filtering in the unit of the coding unit by parsing the information such as the flag determining whether or not to perform the filtering in the unit of the coding unit and determine whether or not to perform the filtering in the unit of the picture unit. In addition, the decoder may perform the adaptive loop filtering only the coding unit having a specific depth in the coding unit by parsing the information on the maximum depth subjected to the filtering.

2. Process of determining adaptive loop filter parameter 2-1. Filter shape and process of determining filter coefficient: when it is determined that the filter shape and the adaptive loop filtering are performed, the decoder may determine one of the filter shapes performing the adaptive loop filtering and the filter coefficients used to perform the adaptive loop filtering. In this case, the number of filter coefficients may be at least one.

2-2. Filter classification process: when it is determined that the adaptive loop filtering is performed, as an example of the filter classification method, one of region-based adaptation (RA) and block-based adaption may be used. When the decoder uses the filter classification method to perform the adaptive loop filtering, the filter may be selected differently. When the region based adaptation is used, any one of the plurality of filters per the split region may be selected and when the block based adaptation is used, any one of the plurality of filters may be selected by considering the variations and directivity of the pixels.

3. Process of performing adaptive loop filtering: the decoder may perform the adaptive loop filtering on the pixels of the reconstructed picture by using whether or not to perform the determined adaptive loop filtering and the determined filter parameter.

The reconstructed picture may be stored in the reference picture buffer 270 so as to be used for the inter-picture prediction.

Figure 3:
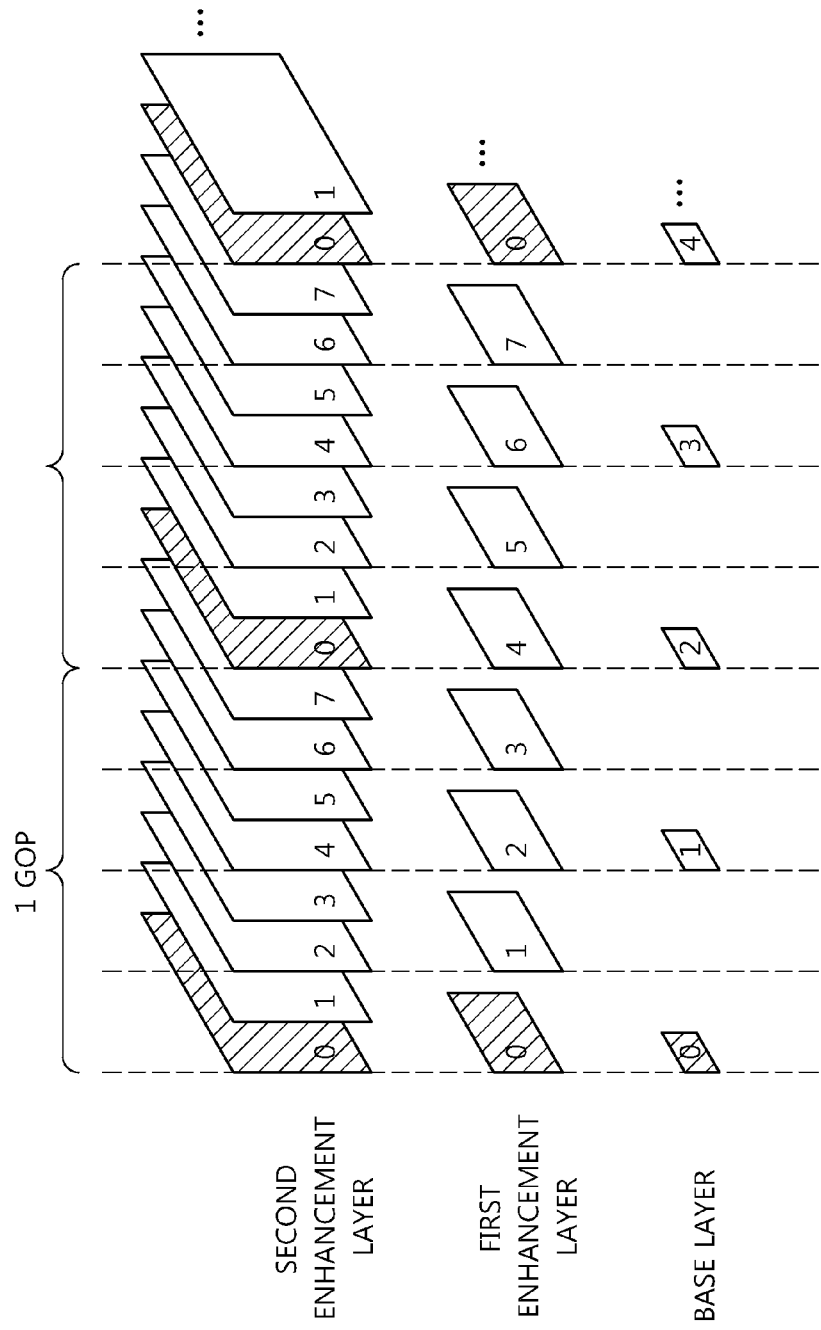
FIG. 3 is a conceptual diagram schematically showing an exemplary embodiment of a scalable video coding structure using multiple layers to which the present invention may be applied.

FIG. 3 is a conceptual diagram schematically showing an exemplary embodiment of a scalable video coding structure using multiple layers to which the present invention may be applied. In FIG. 3, a group of picture (GOP) represents a picture group.

A transmission medium is required so as to transmit the video data and the performance thereof is different for each transmission medium according to various network environments. In order to apply to various transmission media or network environments, a scalable video coding method may be provided.

The scalable video coding/decoding method may be implemented by extension of the general video coding/decoding method that does not provide scalability. The video coding apparatus according to the exemplary embodiment of FIG. 1 and the video decoding apparatus according to the exemplary embodiment of FIG. 2 may be based on the scalable video coding/decoding apparatus. For example, the scalable video coding apparatus may include a plurality of coders having a shape similar to the video coding apparatus according to the exemplary embodiment of FIG. 1. As the exemplary embodiment, the structure of the scalable video coding apparatus may be a structure in which the coder having a type similar to the video coding apparatus according to the exemplary embodiment of FIG. 1 is added to the video coding apparatus according to the exemplary embodiment of FIG. 1. The added video coder may code the bit stream and the reconstructed picture that are generated in the video coding apparatus according to the exemplary embodiment of FIG. 1 and code the videos using the reconstructed picture and the video coding apparatus according to the exemplary embodiment of FIG. 1 may be dependently operated within the scalable video coding apparatus. The scalable video decoding apparatus may include the plurality of decoders having a type similar to the video decoding apparatus according to the exemplary embodiment of FIG. 2 As the exemplary embodiment, the structure of the scalable video decoding apparatus may be a structure in which the video decoder having a type similar to the video decoding apparatus according to the exemplary embodiment of FIG. 2 is added to the video decoding apparatus according to the exemplary embodiment of FIG. 2. The added video decoder may decode the videos by using the bit streams generated in the video coding apparatus according to the exemplary embodiment of FIG. 1 and the reconstructed picture generated in the video decoding apparatus according to the exemplary embodiment of FIG. 2 and may be dependently operated on the video decoding apparatus according to the exemplary embodiment of FIG. 2 within the scalable video decoding apparatus.

The scalable video coding method uses inter-layer texture information, the motion information, the residual signals, or the like, to remove inter-layer redundancy, thereby increasing the coding/decoding performance. The scalable video coding method may provide various scalabilities in terms of space, time, and image quality according to peripheral conditions such as transmission bit rate, transmission error rate, system resources, or the like.

The scalable video coding may be performed using a structure of multiple layers so as to provide the bit streams that may be applied to various network conditions. For example, the scalable video coding structure may include a base layer that compresses and processes the video data using a general video coding method and may include an enhancement layer that compresses and processes the video data using both of the coding information of the base layer and the general video coding method. The structure of multiple layers may include a plurality of spatial layers, a plurality of temporal layers, a plurality of image-quality layers, or the like. The videos included in different spatial layers may have different spatial resolutions and the videos included in different temporal layers may have different temporal resolutions (frame rate). In addition, the videos included in different image-quality layers may have different video qualities, for example, different signal-to-noise ratios (SNRs).

In this configuration, the layer means a set of videos and bit streams that are split based on space (for example, video size), time (for example, coding sequence, video output sequence), image quality, complexity, or the like. In addition, the multiple layers may also have dependency therebetween.

Referring to FIG. 3, for example, the base layer may be defined by a quarter common intermediate format (QCIF), a frame rate of 15 Hz, and a bit rate of 3 Mbps, a first enhancement layer may be defined by a common intermediate format (CIF), a frame rate of 30 Hz, and a bit rate of 0.7 Mbps, and a second enhancement layer may be defined by standard definition (SD), a frame rate of 60 Hz, and a bit rate of 0.19 Mbps. The format, the frame rate, the bit rate, or the like, are one example, but may be defined differently, if necessary. In addition, the number of used layers is not limited to the present exemplary embodiment, but may be defined differently according to the conditions.

In this case, if CIF 0.5 Mbps bit stream is required, the bit stream may be transmitted in pieces so that the bit rate in the first enhancement layer is 0.5 Mbps. The scalable video coding method may provide temporal, spatial, and image-quality scalability according to the above-mentioned method in the exemplary embodiment of FIG. 3.

Hereinafter, an object layer, an object video, an object slice, an object unit, and an object block each mean a layer, a video, a slice, a unit, and a block that are currently coded or decoded. For example, the object layer may be a layer including the object video that is currently coded/decoded. In addition, the other layer, which is a layer other than the object layer, means a layer that may be used in the object layer. That is, the other layer may be used for the decoding performance in the object layer. The layer that may be used in the object layer may be, for example, the temporal, spatial, image-quality lower layer.

In addition, the slice representing a unit in which the video is split is used as a meaning collectively called a split unit such as a tile, an entropy slice, or the like. The video coding and decoding may be independently performed between respective split units.

In addition, the block means the video coding and decoding unit. At the time of the video coding and decoding, the coding or decoding unit means the split unit when performing the coding and decoding by splitting the videos, which may be called a macro block, a coding unit (CU), a prediction unit (PU), a transform unit (TU), a transform block, or the like. The single block may be further split into a lower block having a smaller size.

Figure 4:
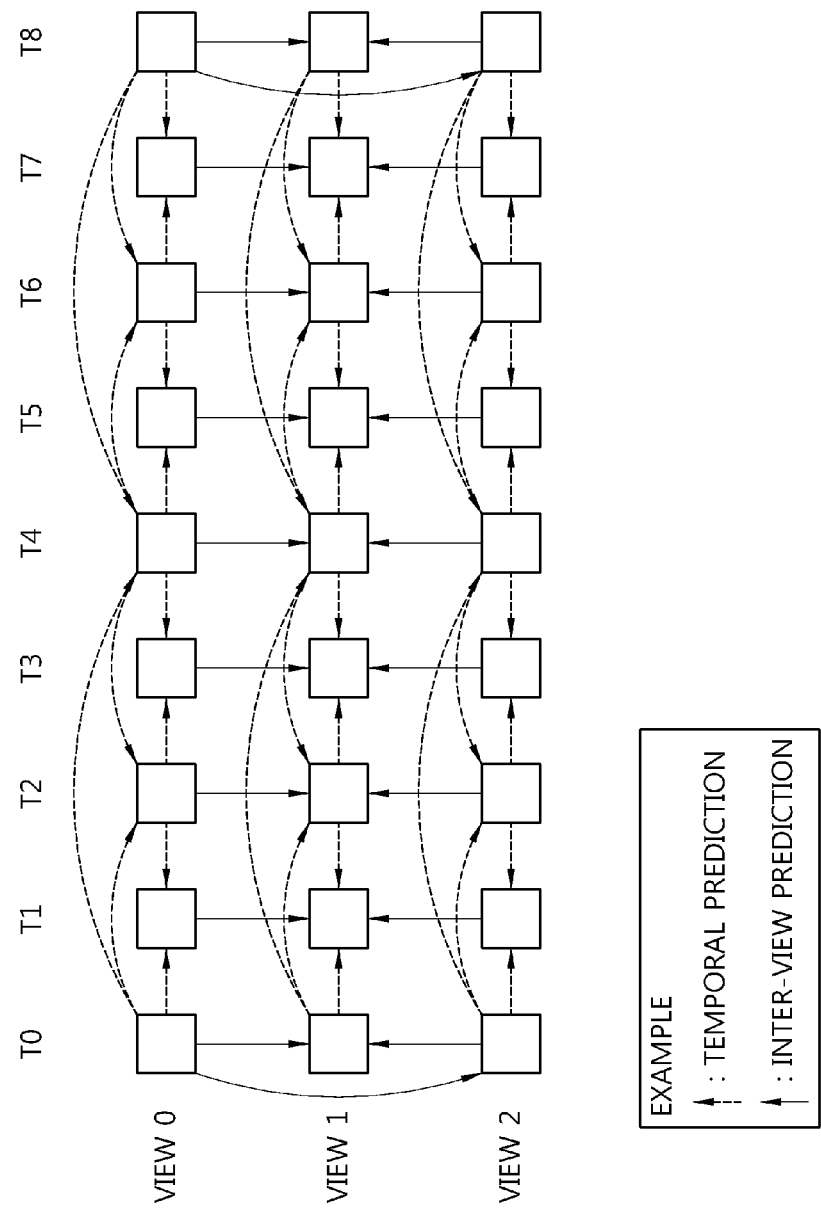
FIG. 4 is a conceptual diagram schematically showing a prediction method in a multi-view video coding/decoding process to which the present invention may be applied.

FIG. 4 is a conceptual diagram schematically showing a prediction method in a multi-view video coding/decoding process to which the present invention may be applied In the three-dimensional video, the same scene may be simultaneously photographed by two or more cameras and therefore, multi-views may be present. Herein, one view means a view of the video captured by a single camera. In the exemplary embodiment of FIG. 4, T0 to T8 represent time.

Referring to the exemplary embodiment of FIG. 4, three views such as view 0, view 1, view 2 may be provided. The number of views is not limited to three and more than two or four views may also be present. The prediction from different videos within the object view may be referred to as temporal prediction and the prediction from the video within different views may be referred to as inter-view prediction. Herein, the object view, the object video, the object slice, the object unit, and the object block each mean a view, a video, a slice, a unit, and a block that are currently coded or decoded. For example, the object view may be a view including the object video that is currently coded/decoded. In addition, different views are a view other than the object view and mean a view usable in the object view.

Referring to the exemplary embodiment of FIG. 4, the videos captured at several views may be coded/decoded in the multi-view video and therefore, the inter-view prediction and the temporal prediction may be used in performing the coding/decoding on the current prediction object unit. In the multi-view video coding, the coding efficiency may be improved by removing the intra-picture redundancy between views through the inter-view prediction.

As described above, the adaptive loop filter, the interpolation filter, the deblocking filter, or the like, may be used during the video coding/decoding process. In addition, the filters may also be used in the scalable video coding according to the exemplary embodiment of FIG. 3 and the multi-view video coding/decoding according to the exemplary embodiment of FIG. 4. In this case, each filter information including the filter coefficients may be predicted within a single layer or a single view and the previously calculated filter coefficients may be used for filtering.

However, as described above, in the scalable video coding/decoding method, the videos may be split into several layers and then, may be used for the coding/decoding and in the multi-view video coding/decoding method, the videos captured at multi views may be used for the coding/decoding. If the videos within the object layer or the object view and the videos within other layers or other views may be used for the prediction of filter information, the redundancy of the information transmitted from the coder to the decoder may be removed and therefore, the transmitted and signaled bit amount may be reduced. In this case, the filter information may be efficiently reused and therefore, the video coding/decoding efficiency may be improved and the calculation complexity of the coder and decoder may also be reduced.

Therefore, in the scalable video coding/decoding method, the inter-layer prediction method predicting the filter information may be provided from other layers and in the multi-view video coding and decoding method, the inter-view prediction method predicting the filter information may be provided from different views.

An example of the filter information to which the exemplary embodiment of the present invention may be applied may include the adaptive loop filter information, the interpolation filter information, the deblocking filter information, or the like. In addition, there may be various types of information such as the adaptive loop filter information, the interpolation filter information, the deblocking filter information, or the like.

The adaptive loop filter information may include, for example, the control information indicating whether the filtering is performed. The information indicating whether the filtering is performed may be a filtering map in a unit or a block unit. When the filtering map is used for the filtering, the filtering map indicating whether the filter is used in the specific unit or the block unit is generated and then, the filtering map may be used to filter the videos of each layer or each view. In addition, the information indicating whether the filtering is performed may be a decision rule determining whether the filtering is performed in a unit, a block, or a pixel unit.

The adaptive loop filter information may include, for example, the control information indicating whether the filtering is performed using any filter. The information indicating whether the filtering is performed using any filter may be a filtering map in a unit or a block unit. When the filtering map is used for the filtering, the filtering map indicating whether any filter is used in the specific unit or the block unit is generated and then, the filtering map may be used to filter the videos of each layer or each view. In addition, the information indicating whether the filtering is performed using any filter may be a decision rule determining whether the filtering is performed in a unit, a block, or a pixel unit. The adaptive loop filter information may be index information indicating whether any of several filters is used.

The adaptive loop filter information may also include a geometric shape of a filter, a filter tap size or length, the prediction coding method of the intra-picture/inter-picture filter, the number of used filters, the quantization step size or the bit depth of the filter information when the filter information is quantized, the filtering calculation method, or the like. An example of the filtering calculation method may include a 1D separable filter, a 2D non-separable filter, or the like.

The adaptive loop filter information may also include the filter coefficient information. The filter coefficient information may include fixed filter coefficients or adaptive filter coefficients. The adaptive filter coefficients may mean filter coefficients calculated so as to reduce the Wiener filter coefficients or errors between the original pictures and the reconstructed pictures. In addition, the filter coefficient information may include the filter coefficients according to the filter coefficients according each color component, that is, luma component and chroma component. The filter coefficient information may also include filter offset information.

The adaptive loop filter information may include at least one of the above-mentioned information and each information may have information values or a type of context elements.

The interpolation filter information may include, for example, the control information indicating whether the filtering is performed. The information indicating whether the filtering is performed may be a filtering map in a unit or a block unit. When the filtering map is used for the filtering, the filtering map indicating whether the filter is used in the specific unit or the block unit is generated and then, the filtering map may be used to filter the videos of each layer or each view. In addition, the information indicating whether the filtering is performed may be a decision rule determining whether the filtering is performed in a unit, a block, or a pixel unit.

The interpolation filter information may include, for example, the control information indicating whether the filtering is performed using any filter. The information indicating whether the filtering is performed using any filter may be a filtering map in a unit or a block unit. When the filtering map is used for the filtering, the filtering map indicating whether any filter is used in the specific unit or the block unit is generated and then, the filtering map may be used to filter the videos of each layer or each view. In addition, the information indicating whether the filtering is performed using any filter may be a decision rule determining whether the filtering is performed in a unit, a block, or a pixel unit. The interpolation filter information may be index information indicating whether any of several filters is used.

The interpolation filter information may also include a geometric shape of a filter, a filter tap size or length, the prediction coding method of the intra-picture/inter-picture filter, the number of used filters, the quantization step size or the bit depth of the filter information when the filter information is quantized, the filtering calculation method, or the like. An example of the filtering calculation method may include a 1D separable filter, a 2D non-separable filter, or the like.

The interpolation filter information may also include the filter coefficient information. The filter coefficient information may include fixed filter coefficients or adaptive filter coefficients. The adaptive filter coefficients may mean filter coefficients calculated so as to reduce the Wiener filter coefficients or errors between the original pictures and the reconstructed pictures. In addition, the filter coefficient information may include the filter coefficients according to the filter coefficients according each color component, that is, luma component and chroma component. The filter coefficient information may include filter offset information.

The interpolation filter information may include at least one of the above-mentioned information and each information may have the information values or the type of context elements.

The deblocking filter information may include, for example, the control information indicating whether the filtering is performed. The information indicating whether the filtering is performed may be a filtering map in a unit or a block unit. When the filtering map is used for the filtering, the filtering map indicating whether the filter is used in the specific unit or the block unit is generated and then, the filtering map may be used to filter the videos of each layer or each view. In addition, the information indicating whether the filtering is performed may be a decision rule determining whether the filtering is performed in a unit, a block, or a pixel unit.

The deblocking filter information may include, for example, the control information indicating whether the filtering is performed using any filter. The information indicating whether the filtering is performed by any filter may be a filtering map in a unit or a block unit. When the filtering map is used for the filtering, the filtering map indicating whether any filter is used in the specific unit or the block unit is generated and then, the filtering map may be used to filter the videos of each layer or each view. In addition, the information indicating whether the filtering is performed by any filter may be a decision rule determining whether the filtering is performed in a unit, a block, or a pixel unit.

The deblocking filter information may also include the filtering performance conditions, the filter strength, the filter geometric shape, the filter tap size or length, the filtering calculation method, or the like. An example of the filtering calculation method may include a 1D separable filter, a 2D non-separable filter, or the like.

The deblocking filter information may also include the filter coefficient information. The filter coefficient information may include the coefficients of the low-frequency pass filter or the coefficients of the high-frequency filter. The filter coefficient information may include the fixed filter coefficients or the adaptive filter coefficients. The adaptive filter coefficients may mean filter coefficients calculated so as to reduce the Wiener filter coefficients or errors between the original pictures and the reconstructed pictures. In addition, the filter coefficient information may include the filter coefficients according to the filter coefficients according each color component, that is, luma component and chroma component. The filter coefficient information may include filter offset information. The deblocking filter information may include at least one of the above-mentioned information and each information may have the information values or the type of context elements.

Figure 5:
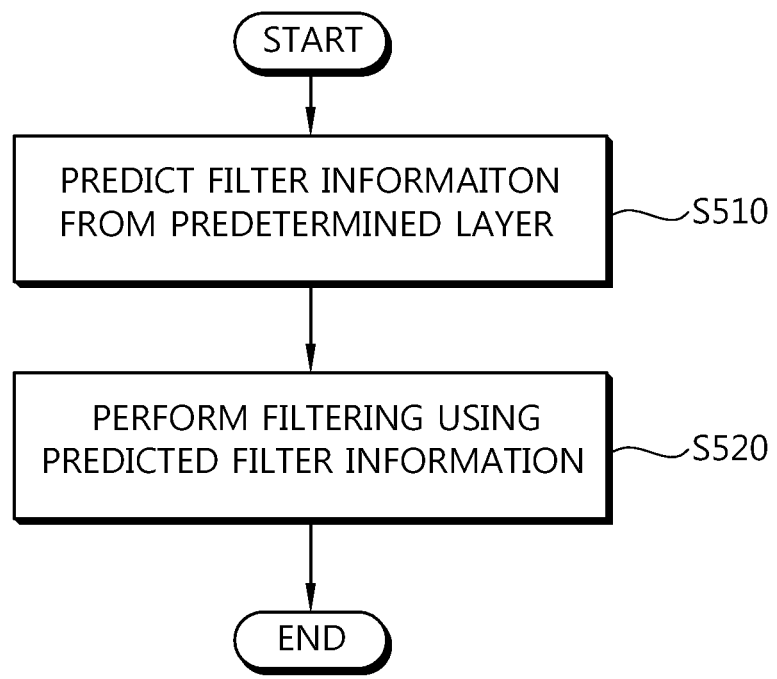
FIG. 5 is a flow chart schematically showing a filtering method for scalable video coding/decoding according to an exemplary embodiment of the present invention.

FIG. 5 is a flow chart schematically showing a filtering method for scalable video coding/decoding according to an exemplary embodiment of the present invention. The filtering method according to the exemplary embodiment of FIG. 5 may also be applied both to the coder and the decoder. In addition, the filter to which the filtering method according to the exemplary embodiment of FIG. 5 is applied may be, for example, the adaptive loop filter, the interpolation filter, the deblocking filter, or the like.

Referring to FIG. 5, the coder and the decoder predict the filter information used for the object reconstructed picture from the predetermined layer (S510). The object reconstructed picture means the reconstructed picture that is the filtering object. The filter information used for the object reconstructed picture may include the calculated filter information and/or the predetermined filter information, or the like.

In predicting the filter information used for the object reconstructed picture, the coder and the decoder may use the information included in the video, the slice, the unit, and/or the block within the predetermined layer.

The predetermined layer, video, slice, unit, and block may be various types. For example, the video, the slice, the unit, and the block within the predetermined layer may be the video, the slice, the unit, and the block of the position that spatially and temporally correspond to the filtering object reconstructed picture, the slice, the unit, and the block as the video, the slice, the unit, and the block of the object layer.

In addition, the video, the slice, the unit, and the block within the predetermined layer may be the video, the slice, the unit, and the block of the position that spatially and temporally correspond to the filtering object reconstructed picture, the slice, the unit, and the block as the video, the slice, the unit, and the block of the other layer.

The video, the slice, the unit, and the block within the predetermined layer may also be the video, the slice, the unit, and the block having the coding parameters that are the same or similar to the filtering object reconstructed picture, the slice, the unit, and the block as the video, the slice, the unit, and the block of the object layer.

In addition, the video, the slice, the unit, and the block within the predetermined layer may also be the video, the slice, the unit, and the block having the coding parameters that are the same or similar as or to the filtering object reconstructed picture, the slice, the unit, and the block as the video, the slice, the unit, and the block of the other layer.

In this case, the coding parameter, which is a parameter necessary for the coding and the decoding, means the information required at the time of coding or decoding the video. The coding parameters may include information that is coded in the coder such as the context element and is transmitted to the decoder and the information that may be derived from the coding or decoding process. The coding parameter may include, for example, the intra/inter prediction mode, the movement/motion vector, the reference picture index, the coding block pattern, the presence and absence of the residual signal, the transform coefficients, the quantized transform coefficients, the quantization parameters, the block size, the values or statistics of block division information, or the like.

The video, the slice, the unit, and the block within the predetermined layer may be the video, the slice, the unit, and the block having the coding parameters that are the same or similar as or to the filtering object reconstructed picture, the slice, the unit, and the block as the video, the slice, the unit, and the block of the object layer.

In addition, the video, the slice, the unit, and the block within the predetermined layer may also be the video, the slice, the unit, and the block having the pixel values that are the same or similar as or to the filtering object reconstructed picture, the slice, the unit, and the block as the video, the slice, the unit, and the block of the other layer.

The predetermined layer may be at least one layer of the object layer and the other layer.

In addition, in the filtering method according to the exemplary embodiment of FIG. 5, the filter information may be predicted from the plurality of layers.

Figure 6:
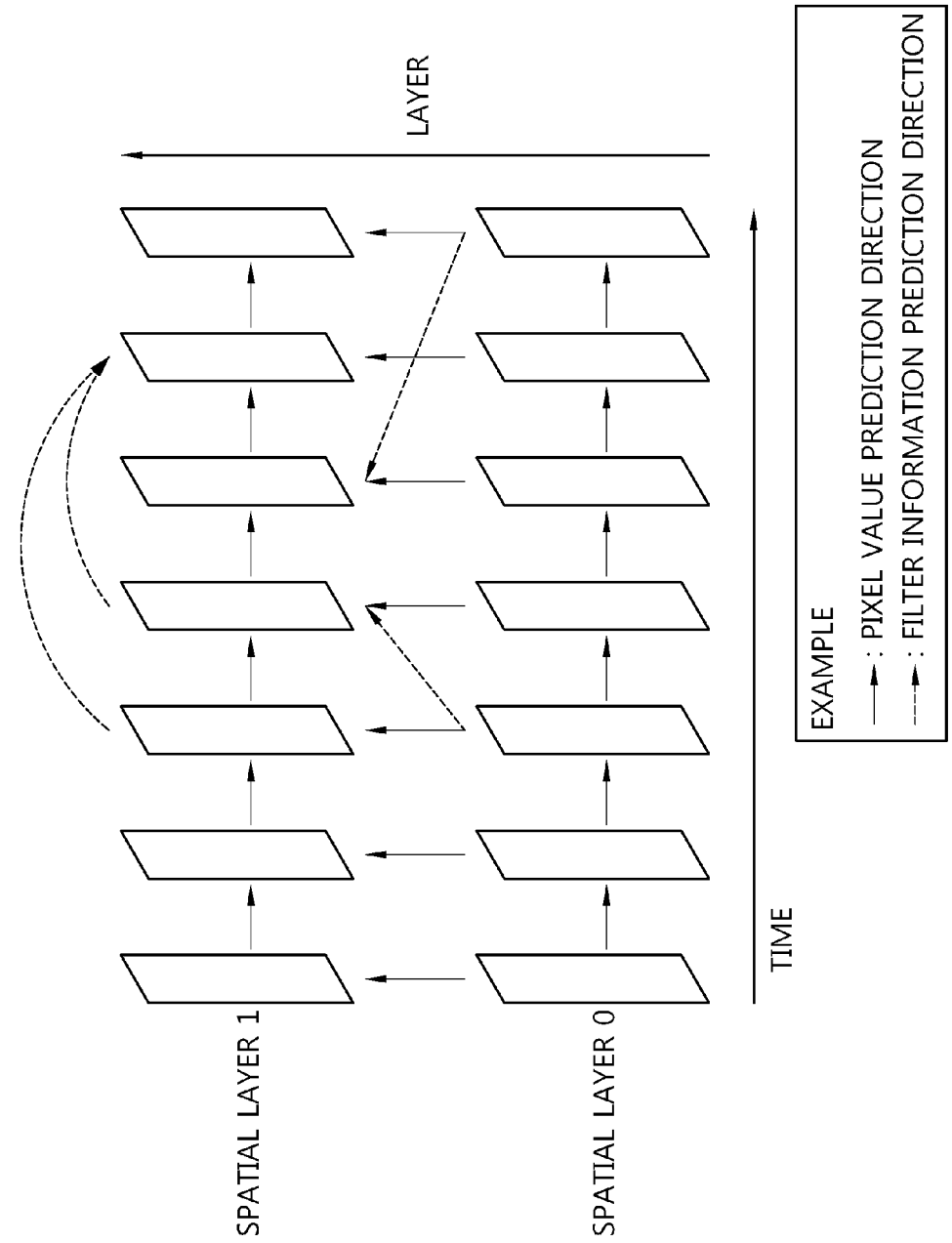
FIG. 6 is a conceptual diagram schematically showing an inter-spatial layer filter information prediction method according to an exemplary embodiment of the present invention.

FIG. 6 is a conceptual diagram schematically showing an inter-layer filter information prediction method according to an exemplary embodiment of the present invention.

In the exemplary embodiment of FIG. 6, two spatial layers are present. The number of spatial layers is not limited to two and therefore, may be 3. Referring to the exemplary embodiment of FIG. 6, the filter information on the video of spatial layer 1 may be predicted from the video of spatial layer 0. In this case, the filter information may be predicted according to spatial layer identification information such as spatial_id within the bit stream.

Figure 7:
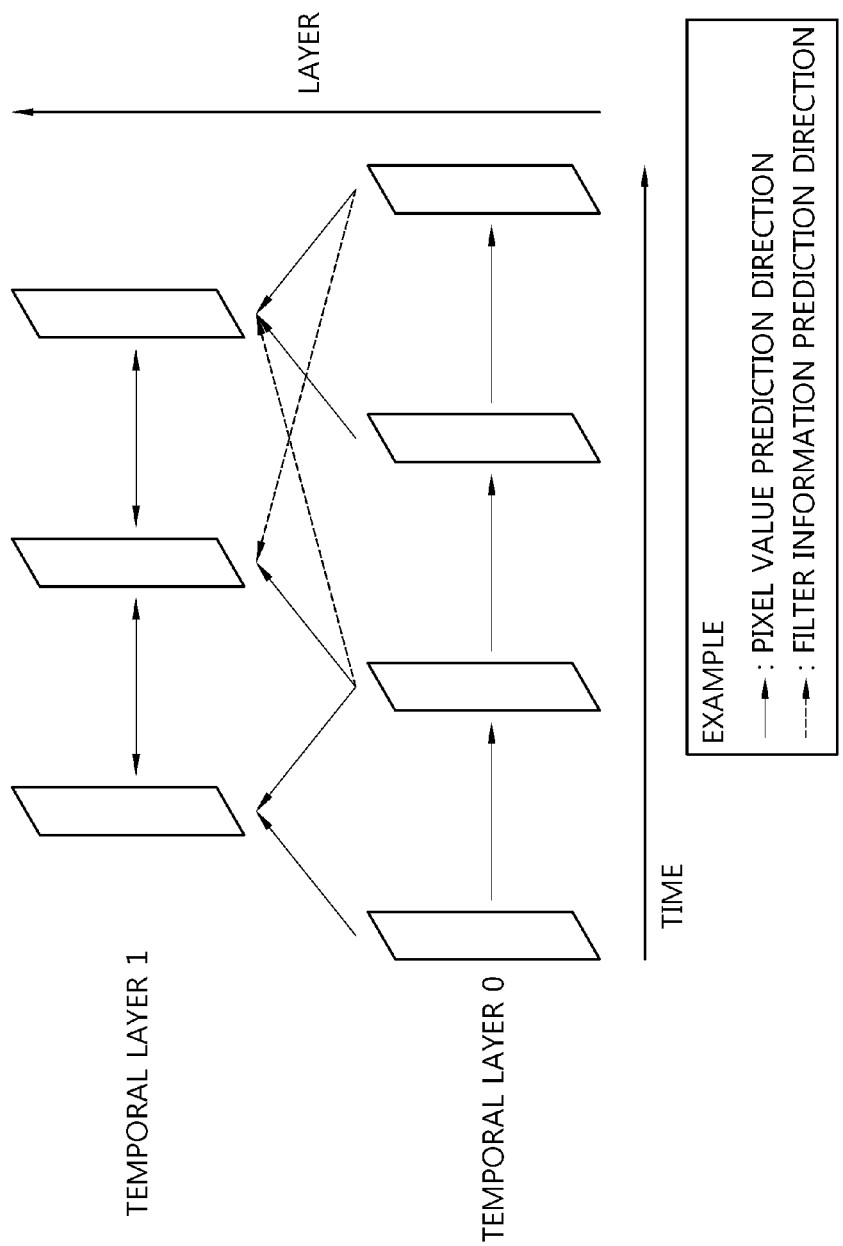
FIG. 7 is a conceptual diagram schematically showing an inter-temporal layer filter information prediction method according to an exemplary embodiment of the present invention.

FIG. 7 is a conceptual diagram schematically showing an inter-temporal layer filter information prediction method according to an exemplary embodiment of the present invention.

In the exemplary embodiment of FIG. 7, two temporal layers are present. The number of temporal layers is not limited to two and therefore, may be 3. Referring to the exemplary embodiment of FIG. 7, the filter information on the video of temporal layer 1 may be predicted from the video of spatial layer 0. In this case, the filter information may be predicted according to the temporal layer identification information such as temporal_id within the bit stream.

Figure 8:
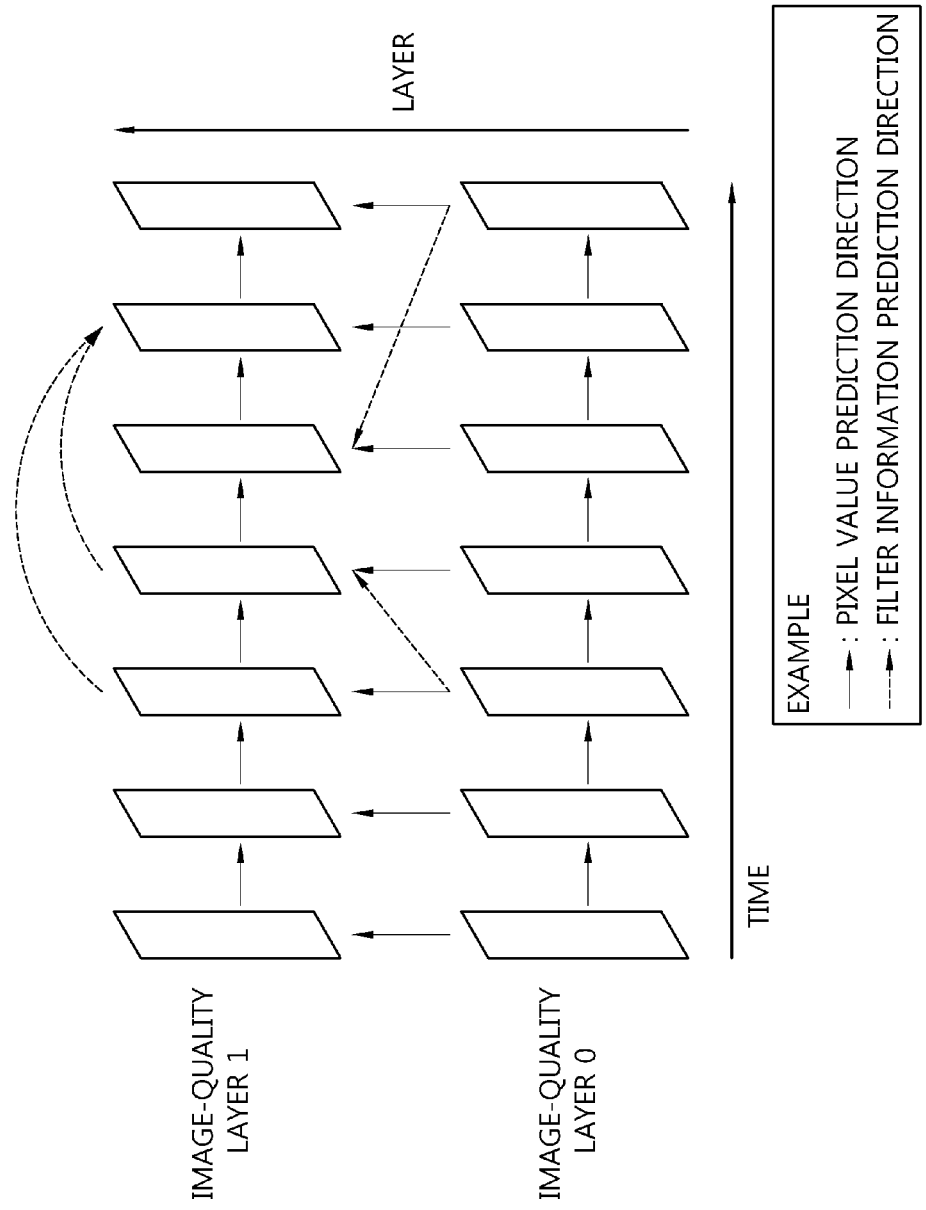
FIG. 8 is a conceptual diagram schematically showing an inter-picture quality layer filter information prediction method according to an exemplary embodiment of the present invention.

FIG. 8 is a conceptual diagram schematically showing an inter-picture quality layer filter information prediction method according to an exemplary embodiment of the present invention.

In the exemplary embodiment of FIG. 8, two image-quality layers are present. The number of image-quality layers is not limited to two and therefore, may be 3. Referring to the exemplary embodiment of FIG. 8, the filter information on the video of image-quality layer 1 may be predicted from the video of image-quality layer 0. In this case, the filter information may be predicted according to the image-quality layer identification information such as quality_id within the bit stream.

The information on whether any of the plurality of filter information is predicted may be generated in the coder and may be transmitted and signaled to the decoder. For example, a filter information candidate list may be used. In this case, the index information indicating whether any filter information is predicted in the list may be transmitted or signaled from the coder to the decoder. In addition, the flag information indicating whether the filter information on each filter information is predicted may be transmitted or signaled from the coder to the decoder. The decoder receives the index information and/or the flag information to predict the filter information and/or determine whether any filter information is predicted, thereby performing the filter information prediction.

The information on whether any of the plurality of filter information is predicted may be obtained using the coding parameters. In this case, the decoder uses the coding parameters at the layer used to predict the filter information to obtain the information on whether the filter information is predicted or any filter information is predicted. The coding parameter may be generated in the coder and may be transmitted to the decoder.

The information on whether the filter information may be predicted from any of the plurality of layers may be generated in the coder and may be transmitted and signaled to the decoder. The decoder may receive the information to determine whether the filter information is predicted from any layer and perform the filter information prediction. In addition, the information on whether the filter information is predicted from any of the plurality of layers may be obtained using the coding parameters. The decoder may receive the information to determine whether the filter information is predicted from any layer using the coding parameters and perform the filter information prediction.

The filter information of the object reconstructed picture may be predicted from the other filter information included in the object layer and/or the other layer. The information on whether the filter information of the object reconstructed picture is predicted from any of the plurality of filter information may be generated in the coder and may be transmitted and signaled to the decoder. In this case, the decoder may receive the information to determine whether the filter information of the object reconstructed picture is predicted from any filter information and perform the filter information prediction. In addition, the information on whether the filter information of the object reconstructed picture is predicted from any of the plurality of filter information may be obtained using the coding parameters. In this case, the decoder may receive the information to determine whether the filter information of the object reconstructed picture is predicted from any filter information using the coding parameters and perform the filter information prediction.

The decoder may predict the filter information of the object reconstructed picture using the information of the object layer and predict the filter information of the object reconstructed picture using the information of the other layer based on values of a filter information prediction indicator.

The filter information prediction indicator is an indicator indicating whether any filter information is predicted and the filter information is predicted in any layer and/or the predicted values are used as they are. As the exemplary embodiment of the filter information prediction indicator, there may be Filter_base_mode, Filter_use_filter_information, Filter_pred_filter_information, or the like.

The Filter_base_mode may indicate that the filter information of the other layer is scaled so as to meet the spatial and temporal resolutions of video and is used to perform the filter information prediction. The Filter_use_filter_information may indicate whether the filter information of the other layer is predicted and then, the predicted value may be used as the filter information of the object reconstructed picture as it is. The Filter_pred_filter_information may indicate whether the filter information of the other layer is predicted and then, the difference value between the predicted value and the object reconstructed picture may be transmitted from the coder to the decoder. The filter information prediction indicator is not limited to the above-mentioned exemplary embodiment and other types of the filter information prediction indicator may also be used according to the method indicating the object layer and the other layer, the prediction method, or the like. After the decoder receives the information, the filter information prediction may be performed based on the information.

The coder and the decoder may use the information of the object layer and/or the other layer to use the predicted filter information as the filter information of the object reconstructed picture as it is.

The coder may transmit the difference value between the filter information used for the object reconstructed picture and the predicted filter information to the decoder. In this case, the decoder receives the difference value and sums up the received difference value and the predicted filter information so as to be used as the filter information of the object reconstructed picture.

Figure 9:
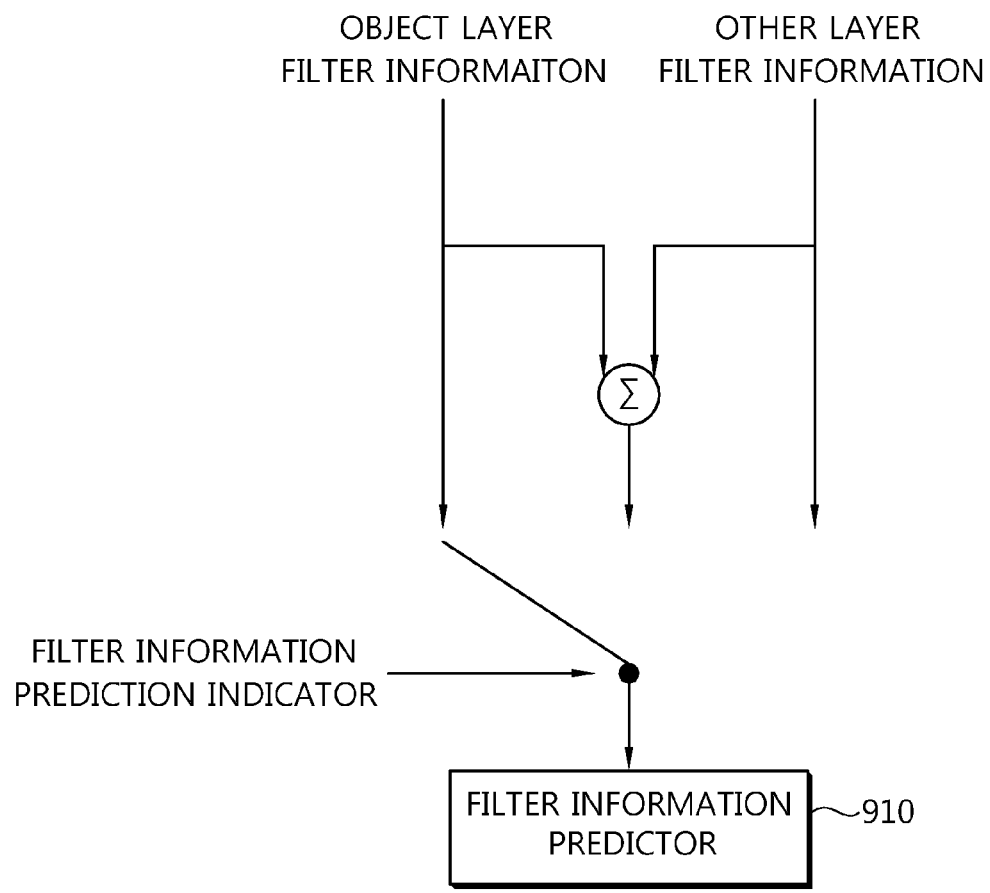
FIG. 9 is a conceptual diagram schematically showing an inter-layer filter information prediction method according to an exemplary embodiment of the present invention.

FIG. 9 is a conceptual diagram schematically showing an inter-layer filter information prediction method according to an exemplary embodiment of the present invention. Referring to FIG. 9, a filter information predictor 910 uses the filter information of the object layer or the filter information of the other layer based on the filter information prediction indicator to predict the filter information of the object reconstructed picture. In addition, the filter information predictor 910 may also use the filter information of the object layer and the filter information of the other layer to predict the filter information of the object reconstructed picture.

Referring again to FIG. 5, the coder and the decoder use the predicted filter information to perform the filtering (S520). The coder and the decoder may use the predicted filter information to perform the filtering on the entire video. In this case, the filtering may be performed in the unit such as the slice, the unit, or the block, or the like.

The coder and the decoder may use the predicted filter information as the prediction information of the filter information used for the object reconstructed picture. The filter information used for the object reconstructed picture may include the calculated filter information and/or the predetermined filter information, or the like, as the information for filtering the object reconstructed picture.

The coder may use the predicted filter information as the prediction information of the filter information used for the object reconstructed picture to transmit or signal the information related to the filter information used for the object reconstructed picture to the coder. For example, the difference value between the filter information used for the object reconstructed picture and the predicted filter information may be transmitted to the decoder. In this case, the decoder sums up the received difference value and the predicted filter information so as to be used as the filter information of the object reconstructed picture. The coder and the decoder may use the predicted filter information as the filter information of the object reconstructed picture as it is.

The coder and the decoder use the filter information of the obtained object reconstructed picture to filter the object reconstructed picture.

The coder and the decoder may use only the predicted filter information to perform the filtering on the object reconstructed picture. As another example, the coder and the decoder may use both the filter information and the predicted filter information used for the object reconstructed picture to perform the filtering on the object reconstructed picture. In this case, only the predicted filter information may be used for the specific slice, the unit, and the block and the filter information used for the object reconstructed picture may be used for other specific slices, units, and blocks. As another example, the coder and the decoder may filter the object reconstructed picture using only the filter information used for the object reconstructed picture without using the predicted filter information.

Referring to FIGS. 5 to 9, when the adaptive loop filter, the interpolation filter, the deblocking filter, or the like, are used during the scalable video coding/decoding process, the coder and the decoder may predict the filter information from the predetermined layer selected from various layers including the other layer and perform the filtering using the filter information. In this case, the coder and the decoder may predict the inter-layer filter information and therefore, the amount of filter information transmitted from the coder to the decoder may be reduced. In addition, the video coding efficiency may be improved and the computation complexity of the coder and the decoder may be reduced.

Figure 10:
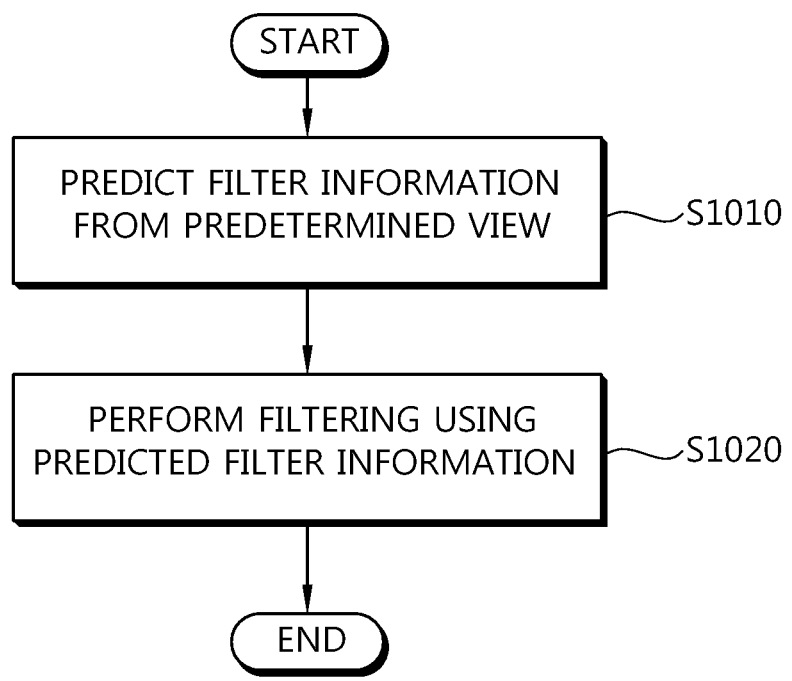
FIG. 10 is a flow chart schematically showing a filtering method for multi-view video coding/decoding according to an exemplary embodiment of the present invention.

FIG. 10 is a flow chart schematically showing a filtering method for multi-view video coding/decoding according to an exemplary embodiment of the present invention. The filtering method according to the exemplary embodiment of FIG. 10 may also be applied both to the coder and the decoder. In addition, the filter to which the filtering method according to the exemplary embodiment of FIG. 10 is applied may be, for example, the adaptive loop filter, the interpolation filter, the deblocking filter, or the like.

Referring to FIG. 10, the coder and the decoder predict the filter information used for the object reconstructed picture from the predetermined view (S1010).

In predicting the filter information used for the object reconstructed picture, the coder and the decoder may use the information included in the video, the slice, the unit, and/or the block within the predetermined view.

The predetermined view, video, slice, unit, and block may be various types. For example, the video, the slice, the unit, and the block within the predetermined view may be the video, the slice, the unit, and the block of the position that spatially and temporally correspond to the filtering object reconstructed picture, the slice, the unit, the block as the video, the slice, the unit, and the block of the object view.

In addition, the video, the slice, the unit, and the block within the predetermined view may be the video, the slice, the unit, and the block of the position that spatially and temporally correspond to the filtering object reconstructed picture, the slice, the unit, the block as the video, the slice, the unit, and the block of the other view.

The video, the slice, the unit, and the block within the predetermined view may be the video, the slice, the unit, and the block having the coding parameters that are the same or similar to the filtering object reconstructed picture, the slice, the unit, the block as the video, the slice, the unit, and the block of the object view.

In addition, the video, the slice, the unit, and the block within the predetermined view may also be the video, the slice, the unit, and the block having the coding parameters that are the same or similar as or to the filtering object reconstructed picture, the slice, the unit, the block as the video, the slice, the unit, and the block of the other view.

The video, the slice, the unit, and the block within the predetermined view may be the video, the slice, the unit, and the block having the coding parameters that are the same or similar as or to the filtering object reconstructed picture, the slice, the unit, the block as the video, the slice, the unit, and the block of the object view.

In addition, the video, the slice, the unit, and the block within the predetermined view may also be the video, the slice, the unit, and the block having the pixel values that are the same or similar as or to the filtering object reconstructed picture, the slice, the unit, the block as the video, the slice, the unit, and the block of the other view.

The predetermined view may be at least one of the object view and the other view.

In addition, in the filtering method according to the exemplary embodiment of FIG. 10, the filter information may be predicted from the multi views.

Figure 11:
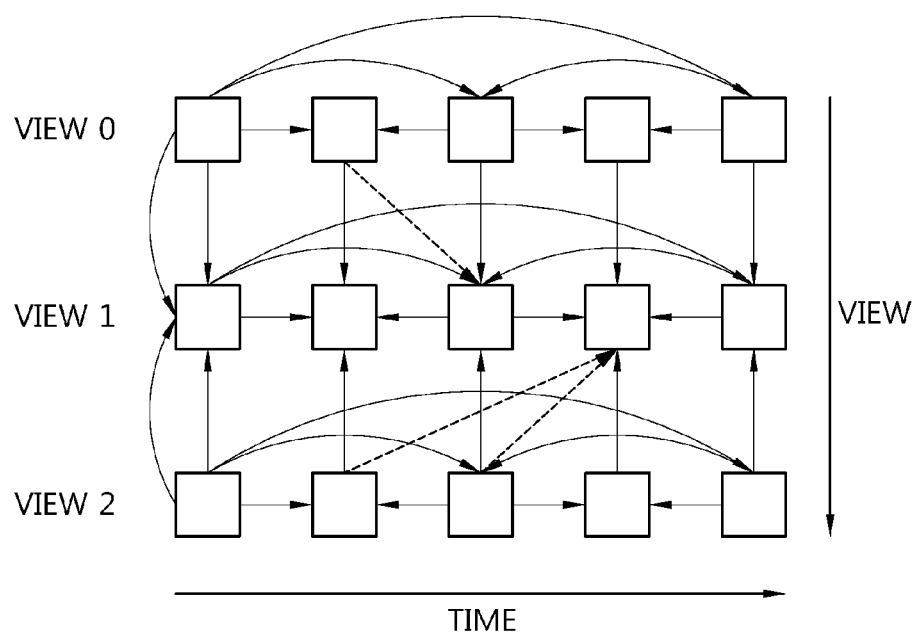
FIG. 11 is a conceptual diagram schematically showing an inter-view filter information prediction method according to an exemplary embodiment of the present invention.

FIG. 11 is a conceptual diagram schematically showing an inter-view filter information prediction method according to an exemplary embodiment of the present invention. In the exemplary embodiment of FIG. 11, three views are present. The number of views is not limited to three and therefore, may be 2 or 4 or more. Referring to the exemplary embodiment of FIG. 11, the filter information on the video of view 1 may be predicted from the video of view 0 and view 2. In this case, the filter information may be predicted according to the view identification information such as view_id within the bit stream.

The information on whether any of the filter information is predicted may be generated in the coder and may be transmitted and signaled to the decoder. For example, a filter information candidate list may be used. In this case, the index information indicating whether any filter information is predicted in the list may be transmitted or signaled from the coder to the decoder. In addition, the flag information indicating whether the filter information on each filter information is predicted may be transmitted or signaled from the coder to the decoder. The decoder receives the index information and/or the flag information to predict the filter information and/or determine whether any filter information is predicted, thereby performing the filter information prediction.

The information on whether any of the filter information is predicted may be obtained using the coding parameters. In this case, the decoder uses the coding parameters at the view used to predict the filter information to obtain the information on whether the filter information is predicted or any filter information is predicted. The coding parameter may be generated in the coder and may be transmitted to the decoder.

The information on whether the filter information is predicted from any of the multi views may be generated in the coder and may be transmitted and signaled to the decoder. The decoder may receive the information to determine whether the filter information is predicted from any view and perform the filter information prediction. In addition, the information on whether the filter information is predicted from any of the multi views may be obtained using the coding parameters. The decoder may determine whether the filter information is predicted from any view using the coding parameters and perform the filter information prediction.

The filter information of the object reconstructed picture may also be predicted from the other filter information included in the object layer and/or the other layer. The information on whether the filter information of the object reconstructed picture is predicted from any of the plurality of filter information may be generated in the coder and may be transmitted and signaled to the decoder. In this case, the decoder receives the information to determine whether the filter information of the object reconstructed picture is predicted from any filter information and perform the filter information prediction. In addition, the information on whether the filter information of the object reconstructed picture is predicted from any of the plurality of filter information may be obtained using the coding parameters. In this case, the decoder may determine whether the filter information of the object reconstructed picture is predicted from any filter information using the coding parameters and perform the filter information prediction.

The decoder may predict the filter information of the object reconstructed picture using the information of the object view and predict the filter information of the object reconstructed picture using the information of the other view based on values of a filter information prediction indicator.

The filter information prediction indicator is an indicator indicating whether any filter information is predicted and the filter information is predicted at any view and/or the predicted values are used as they are. As the exemplary embodiment of the filter information prediction indicator, there may be Filter_base_mode, Filter_use_filter_information, Filter_pred_filter_information, or the like. The meaning of each indicator is similar to the above-mentioned one in the exemplary embodiment of FIG. 5.

The Filter_base_mode may indicate that the filter information of the other view is scaled so as to meet the spatial and temporal resolutions and is used to perform the filter information prediction. The Filter_use_filter_information may indicate whether the filter information of the other view is predicted and then, the predicted value may be used as the filter information of the object reconstructed picture as it is. The Filter_pred_filter_information may indicate whether the filter information of the other view is predicted and then, the difference value between the predicted value and the object reconstructed picture may be transmitted from the coder to the decoder. The filter information prediction indicator is not limited to the above-mentioned exemplary embodiment and other types of the filter information prediction indicator may also be used according to the method indicating the object view and the other view, the prediction method, or the like. After the decoder receives the information, the filter information prediction may be performed based on the information.

The coder and the decoder may use the information of the object view and/or the other view to use the predicted filter information as the filter information of the object reconstructed picture as it is.

The coder may transmit the difference value between the filter information used for the object reconstructed picture and the predicted filter information to the decoder. In this case, the decoder receives the difference value and sums up the received difference value and the predicted filter information so as to be used as the filter information of the object reconstructed picture.

Figure 12:
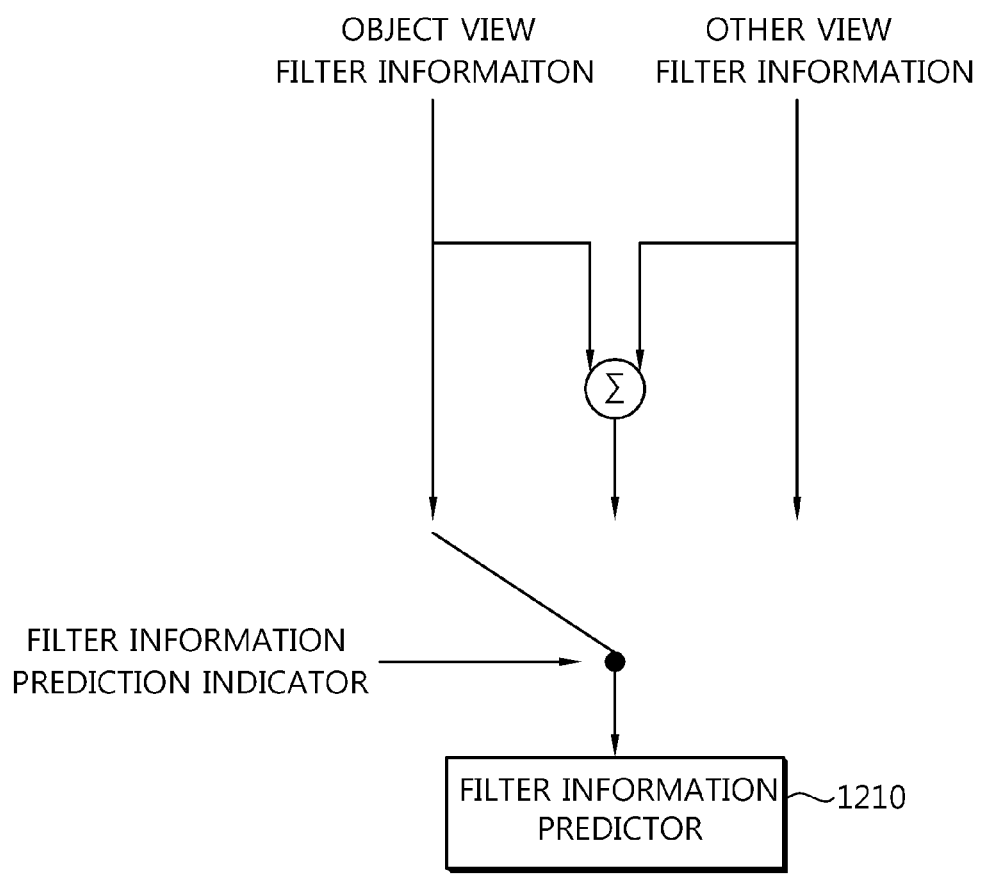
FIG. 12 is a conceptual diagram schematically showing an inter-view filter information prediction method according to an exemplary embodiment of the present invention.

FIG. 12 is a conceptual diagram schematically showing an inter-view filter information prediction method according to an exemplary embodiment of the present invention. Referring to FIG. 12, a filter information predictor 1210 uses the filter information of the object view or the filter information of the other view based on the filter information prediction indicator to predict the filter information of the object reconstructed picture. In addition, the filter information predictor 1210 may also use the filter information of the object view and the filter information of the other view to predict the filter information of the object reconstructed picture.

Referring again to FIG. 10, the coder and the decoder use the predicted filter information to perform the filtering (S1020). The coder and the decoder may use the predicted filter information to perform the filtering on the entire video. In this case, the filtering may be performed in the unit such as the slice, the unit, or the block, or the like.

The coder and the decoder may use the predicted filter information as the prediction information of the filter information used for the object reconstructed picture. The filter information used for the object reconstructed picture may include the calculated filter information and/or the predetermined filter information, or the like, as the information for filtering the object reconstructed picture.

The coder may use the predicted filter information as the prediction information of the filter information used for the object reconstructed picture to transmit or signal the information related to the filter information used for the object reconstructed picture to the coder. For example, the difference value between the filter information used for the object reconstructed picture and the predicted filter information may be transmitted to the decoder. In this case, the decoder sums up the received difference value and the predicted filter information so as to be used as the filter information of the object reconstructed picture. The coder and the decoder may use the predicted filter information as the filter information of the object reconstructed picture as it is.

The coder and the decoder use the filter information of the obtained object reconstructed picture to filter the object reconstructed picture.

The coder and the decoder may use only the predicted filter information to perform the filtering on the object reconstructed picture. As another example, the coder and the decoder may use both the filter information and the predicted filter information used for the object reconstructed picture to perform the filtering on the object reconstructed picture. In this case, only the predicted filter information may be used for the specific slice, the unit, and the block and the filter information used for the object reconstructed picture may be used for the other specific slice, unit, and block. As another example, the coder and the decoder may filter the object reconstructed picture using only the filter information used for the object reconstructed picture without using the predicted filter information.

Referring to FIGS. 10 to 12, when the adaptive loop filter, the interpolation filter, the deblocking filter, or the like, are used during the scalable video coding/decoding process, the coder and the decoder may predict the filter information from the predetermined view selected from multi view including the other view and perform the filtering using the filter information. In this case, the coder and the decoder may predict the inter-view filter information and therefore, the amount of filter information transmitted from the coder to the decoder may be reduced. In addition, the video coding efficiency may be improved and the computation complexity of the coder and the decoder may be reduced.

In the above-mentioned exemplary system, although the methods have described based on a flow chart as a series of steps or blocks, the present invention is not limited to a sequence of steps but any step may be generated in a different sequence or simultaneously from or with other steps as described above. Further, it may be appreciated by those skilled in the art that steps shown in a flow chart is non-exclusive and therefore, include other steps or deletes one or more steps of a flow chart without having an effect on the scope of the present invention.

The above-mentioned embodiments include examples of various aspects. Although all possible combinations showing various aspects are not described, it may be appreciated by those skilled in the art that other combinations may be made. Therefore, the present invention should be construed as including all other substitutions, alterations and modifications belong to the following claims.

The invention claimed is:

1. A scalable video decoding method based on multi layers, comprising:

generating second filter information by using at least one of information included in an object layer and information included in the other layer; and performing filtering on a video to be filtered by using the first filter information based on the second filter information, and receiving difference information of the first filter information and the second filter information from a coder, wherein the object layer is a layer including the video to be filtered, the other layer that is a layer other than the object layer is used to perform decoding at the object layer, the first filter information is information for filtering of the video to be filtered, and the second filter information is prediction filter information generated for filtering the video to be filtered, and wherein the performing of the video to be filtered using the first filter information based on the second filter information includes:

generating the first filter information by summing up the second filter information and the difference information; and performing the filtering on the video to be filtered using the first filter information.

2. The method of claim 1, wherein the first filter information is at least one of adaptive loop filter information, interpolation filter information, and deblocking filter information.

3. The method of claim 1, further comprising receiving a filter information prediction indicator from a coder, wherein the filter information prediction indicator indicates at least one of information on whether prediction for any of the first filter information is performed, information on whether the prediction for the first filter information is performed using information of any layer, information on whether the first filter information is predicted from any filter information, and information on a method using the second filter information.

4. The method of claim 3, wherein at the generating of the second filter information including the prediction values for the first filter information, the prediction for the first filter information is performed using information included in a layer indicated by the filter information prediction indicator among the object layer and the other layer.

5. A filtering method for decoding scalable videos based on multi layers, comprising:

processing computer executable program code embodied in computer readable storage media by a decoding processor, the computer executable program code comprising:

program code that generates second filter information by using at least one of information included in an object layer and information included in the other layer; and program code that performs filtering on a video to be filtered by using the first filter information based on the second filter information, and program code that receives difference information of the first filter information and the second filter information from a coder, wherein the object layer is a layer including the video to be filtered, the other layer that is a layer other than the object layer is used to perform decoding at the object layer, the first filter information is information for filtering of the video to be filtered, and the second filter information is prediction filter information generated for filtering the video to be filtered, and wherein the performing of the video to be filtered using the first filter information based on the second filter information includes:
  generating the first filter information by summing up the second filter information and the difference information; and
  performing the filtering on the video to be filtered using the first filter information.

6. The filtering method of claim 5, wherein the first filter information is at least one of adaptive loop filter information, interpolation filter information, and deblocking filter information.

7. The filtering method of claim 5, further comprising program code that receives a filter information prediction indicator from a coder, wherein the filter information prediction indicator indicates at least one of information on whether prediction for any of the first filter information is performed, information on whether the prediction for the first filter information is performed using information of any layer, information on whether the first filter information is predicted from any filter information, and information on a method using the second filter information.

8. The filtering method of claim 7, wherein at the generating of the second filter information including the prediction values for the first filter information, the prediction for the first filter information is performed using information included in a layer indicated by the filter information prediction indicator among the object layer and the other layer.

9. A multi-view video decoding method based on videos captured at multi views, comprising:
  generating second filter information by using at least one of information included in an object view and information included in the other view;
  performing filtering on a video to be filtered by using the first filter information based on the second filter information, and
  receiving difference information of the first filter information and the second filter information from a coder,
  wherein the object view is a view including the video to be filtered, the other view that is a view other than the object view is used to perform decoding at the object view, the first filter information is information for filtering of the video to be filtered, and the second filter information is prediction filter information generated for filtering the video to be filtered, and
  wherein the performing of the video to be filtered using the first filter information based on the second filter information includes:
    generating the first filter information by summing up the second filter information and the difference information; and
    performing the filtering on the video to be filtered using the first filter information.

10. The multi-view video decoding method of claim 9, wherein the first filter information is at least one of adaptive loop filter information, interpolation filter information, and deblocking filter information.

11. The multi-view video decoding method of claim 9, further comprising receiving a filter information prediction indicator from a coder,
  wherein the filter information prediction indicator indicates at least one of information on whether prediction for any of the first filter information is performed, information on whether the prediction for the first filter information is performed using information of any view, information on whether the first filter information is predicted from any filter information, and information on a method using the second filter information.

12. The multi-view video decoding method of claim 11, wherein at the generating of the second filter information including the prediction values for the first filter information, the prediction for the first filter information is performed using information included in a view indicated by the filter information prediction indicator among the object view and the other view.

13. A filtering method for decoding multi-view videos based on videos captured at multi views, comprising:
  processing computer executable program code embodied in computer readable storage media by a decoding processor, the computer executable program code comprising:
    program code that generates second filter information by using at least one of information included in an object view and information included in the other view; and
    program code that performs filtering on a video to be filtered by using the first filter information based on the second filter information,
  program code that receives difference information of the first filter information and the second filter information from a coder,
  wherein the object view is a view including the video to be filtered, the other view that is a view other than the object view is used to perform decoding at the object view, the first filter information is information for filtering of the video to be filtered, and the second filter information is prediction filter information generated for filtering the video to be filtered, and
  wherein the performing of the video to be filtered using the first filter information based on the second filter information includes:
    generating the first filter information by summing up the second filter information and the difference information; and
    performing the filtering on the video to be filtered using the first filter information.

14. The method of claim 13, wherein the first filter information is at least one of adaptive loop filter information, interpolation filter information, and deblocking filter information.

15. The filtering method of claim 13,
  further comprising program code that receives a filter information prediction indicator from a coder, wherein the filter information prediction indicator indicates at least one of information on whether prediction for any of the first filter information is performed, information on whether the prediction for the first filter information is performed using information of any view, information on whether the first filter information is predicted from any filter information, and information on a method using the second filter information.

16. The filter method of claim 15, wherein at the generating of the second filter information including the prediction values for the first filter information, the prediction for the first filter information is performed using information included in a view indicated by the filter information prediction indicator among the object view and the other view.

* * * * *